C. W. WASHBURN.
PRUNING SHEARS.
APPLICATION FILED NOV. 18, 1908.
936,390.
Patented Oct. 12, 1909.
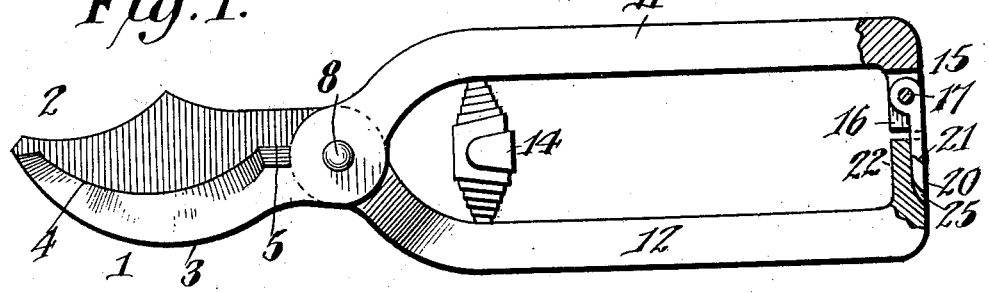
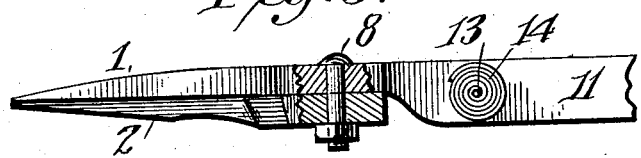
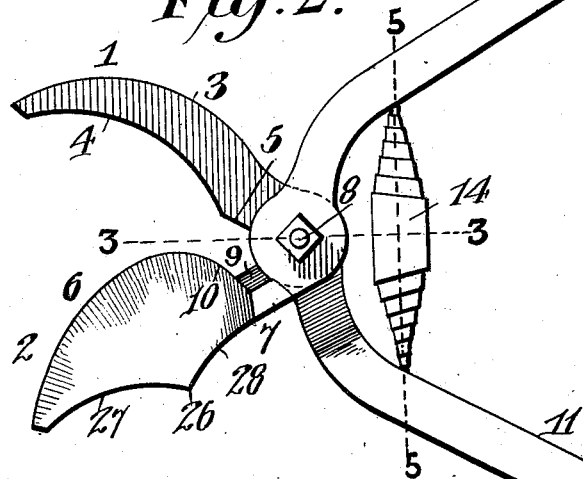
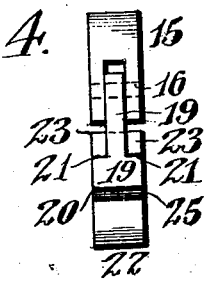
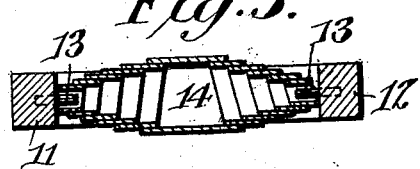
Witnesses
E. L. Mueller
Irw. L. McCathran
Inventor
Clarence W. Washburn
By E. E. Crossman
his Attorney

UNITED STATES PATENT OFFICE.

CLARENCE W. WASHBURN, OF SARATOGA SPRINGS, NEW YORK.

PRUNING-SHEARS.

936,390. Specification of Letters Patent. Patented Oct. 12, 1909.

Application filed November 18, 1908. Serial No. 463,223.

*To all whom it may concern:*

Be it known that I, CLARENCE W. WASHBURN, a citizen of the United States, residing at Saratoga Springs, in the county of Saratoga and State of New York, have invented certain new and useful Improvements in Pruning-Shears, of which the following is a specification, reference being had therein to the accompanying drawing.

This invention relates to pruning shears and has specially in view certain improvements therein whereby the same may be used for cutting wire, and also in the provision of a novel latching mechanism for retaining the shears in a closed position against the tension of a spring.

In carrying out the objects of the invention as generally stated above it will of course be obvious that the essential features are susceptible of modifications as to details, but a preferred and practical embodiment of the invention is shown in the accompanying drawings, wherein—

Figure 1 is a side elevation of the improved pruning shears, showing the same in a closed position. Fig. 2 is a similar view, taken from the opposite side and showing the shears in an open position. Fig. 3 is a transverse sectional view taken on the line 3—3, Fig. 2. Fig. 4 is an elevation of the rear end of the shears showing the latching mechanism for retaining the same in a closed position. Fig. 5 is a sectional view taken on the line 5—5, Fig. 2.

Like characters of reference designate corresponding parts.

The invention embodies in its general organization two pivotally connected opposing jaws 1 and 2, respectively, the jaw 1 being provided with the usual convexed outer surface 3 which facilitates the use of the shears with said surface 3 resting on the ground, and the concaved cutting surface or edge 4.

The inner end portion of the cutting edge 4 is arranged in a straight plane to form one member of a wire cutter, said portion being designated by the numeral 5 and is formed by beveling off the side thereof at a greater angle than the side of the cutting edge 4, so that it will be considerably thicker to withstand the greater cutting strain that is imposed thereon. The opposite jaw 2 has a convexed cutting edge 6 and said jaw is preferably formed thinner than the jaw 1 and is provided with a thickened neck 7 at its inner portion adjacent to its pivotal connection 8 with the jaw 1. Said neck has its inner edge beveled off to provide a straight cutting edge 9 complemental to the cutting edge 5 of the jaw 1 and with which it coöperates to form a wire cutter.

Referring more particularly to Fig. 2 of the accompanying drawings, it will be observed that the convexed cutting jaw 6 of the shears has a somewhat abrupt junction with the wire cutter 9 which provides a stop shoulder 10 that serves to prevent the wire passing from the wire cutting edge 9 to the more delicate cutting edge of the said jaws 1 and 2.

The handles 11 and 12 of the cutting jaws are each provided with an inwardly projecting pin 13 which serves as holding means for a spring 14 that is interposed between said handles and which exerts a constant pressure tending to force said handles apart. Said spring is preferably of the convolute type shown, but it will of course be obvious that other types of spring may be employed.

The end of the handle 11 terminates in an inturned extension 15 which is bifurcated to form pivot ears 16 for the reception of a pivot pin 17 upon which a latch 18 is mounted. Said latch has a narrow elongated stem 19 which is of such a size that it may be freely swung between said pivot ears and its latching head 19 has its free edge 20 beveled or rounded and at its junction with said stem 19, is provided with oppositely disposed outstanding and beveled shoulders 21. The handle 12 also has its end inturned, as indicated at 22, the rear face of which is provided with oppositely disposed outstanding abutment lugs 23 which are spaced apart a sufficient distance to permit of the stem 19 of the latch 18 to be placed between them, and on their rear faces are provided with a beveled notch 24 which forms the end of a recess 25 formed in the said rear face of the inturned end 22, said recess 25 being inclined or concaved.

The described arrangement of latch and latch receiving recess 25 is such that when said parts are engaged as indicated in Fig. 4, the beveled shoulders 21 of the latching head 19 will fit snugly within the beveled notches 24 of the abutment lugs 23, with the stem 19 between said lugs, which holds the inturned ends of the handles 11 and 12 closely adjacent one another. To release the latch from the recess, the said handles are brought together, which movement causes the latching head to leave the notches 24 and ride up the inclined, or concaved bottom of said recess 25 to a position where the latch may be swung on its pivot to clear said recesses and notches. Such movement of the latch being, of course greatly facilitated by reason of its free edge 20 being rounded or beveled.

The cutting jaw 2 is preferably provided with an upstanding point 26 at a point adjacent to the center of its outer edge, from which point said edge curves in opposite directions as indicated at 27 and 28, to form concave tearing edges and intermediate tearing point, the object of which is well understood.

From the foregoing description it will be understood that the present invention is one that is of especial value for gardening use in which provision is made for the cutting of wire or the like incidental to work about hedges, fences &c., such work usually requiring the gardener to be provided with two separate tools, one for cutting wire and the other for cutting the shrubbery. And it will also be understood that the form of latching mechanism used for holding the tool closed, is the one that insures of the same being held in a locked position, and thereby overcome any danger of the tool opening when not in use, such for instance as when in the pocket of the gardener with its consequent danger of tearing the garments and also injuring the user.

Claims:—

1. A device of the character described comprising two oppositely disposed pivotally connected jaws provided respectively with a concaved and a convexed cutting edge, said concaved and convexed cutting edges terminating in a straight plane cutting edge of thick material, the junction of the straight plane cutting edge with the convexed cutting edge forming a stop shoulder adapted to prevent the material cut by said straight plane edges passing to the said concaved and convex edges, handles for each jaw, a spring interposed between the handles, and a latch for holding the handles in a closed position.

2. A device of the character described comprising a pair of oppositely disposed pivotally connected handles having a cutting jaw at one end, the other end of said handles being inturned, one of said inturned ends being provided with outstanding spaced apart lugs having beveled notches formed in them, said end being also provided with an inclined recess which terminates at said notches, the other inturned end being provided with pivot ears, a latch pivotally mounted between said pivot ears and provided with an elongated stem and a head the free edge of which is rounded and whose opposite edge is provided with outstanding beveled shoulders, whereby said latch may be interlocked with the inclined recess with its stem resting between the outstanding lugs and its shoulders in said beveled notches, and a spring interposed between said handles and exerting a pressure tending to force the same apart.

In testimony whereof I hereunto affix my signature in presence of two witnesses.

CLARENCE W. WASHBURN.

Witnesses:
E. T. STEFFENS,
JOSEPH LEE.